Patented Jan. 29, 1924.

1,481,845

UNITED STATES PATENT OFFICE.

JACOB LUND AND HERMANN HAUSAMANN, OF FREDRIKSTAD, NORWAY, ASSIGNORS TO DE NORDISKE FABRIKER, OF CHRISTIANIA, NORWAY.

TREATMENT OF NONSATURATED ORGANIC ACIDS.

No Drawing.   Application filed March 19, 1920.   Serial No. 367,249.

*To all whom it may concern:*

Be it known that we, JACOB LUND, a citizen of the Kingdom of Norway, and HERMANN HAUSAMANN, a citizen of the Swiss Republic, both residing at Fredrikstad, Norway, have invented certain new and useful Improvements in the Treatment of Nonsaturated Organic Acids, of which the following is a specification.

Our invention relates to non-saturated organic acids and more especially to non-saturated fatty acid and its particular object is a method of treating such acids so as to obtain therefrom light-colored and substantially odourless products of polymerization which are practically free of products of decomposition.

It is a well-known fact that the glycerides of non-saturated fatty acids are polymerized by prolonged heating to temperatures between 280 and 310 degrees C., the change these products are undergoing during this treatment being such that the fatty acids obtained with the polymerized glycerides can be utilized far better and to a greater extent, as they do not oxidize any more so easily and are not changed in an unfavorable manner by such oxidation. However, long heating to temperatures above 280 degr. C. causes troublesome and detrimental secondary reactions to take place. Thus the glycerides of non-saturated fatty acids are converted by decomposition into free fatty acids and acroleine and lower molecular fatty acids and hydrocarbons are formed from the oxy compounds. Thus polymerization at high temperatures between 280 and 310 degr. C. is accompanied by a considerable loss of fatty acid and glycerine.

We have now ascertained that an equally far-reaching polymerization can be obtained also at comparatively low temperatures not exceeding 250 and preferably between 180 and 215 degr. C., if first of all the glycerides are decomposed and the fatty acids are converted into soluble salts which are then heated in a closed vessel under increased pressure. Preferably an addition of alcaline substances such as soda is made, greater quantities of such substances rendering working at low temperatures feasible.

We have further ascertained that the high temperature required up till now for the polymerization was due party to the impurities adhering to the fatty acids which are prepared for instance from fish-oil, residual oils and the like, the degrees of concentration playing also a rôle with regard to the polymerization temperature.

We therefore prefer subjecting the fatty acids, before polymerization is started, to treatment adapted to remove or destroy the impurities, the purified acids being converted into soluble salts, whereupon they are refined, as by treating them with caustic alcali, and separated by means of salt, to be then concentrated by distilling off the water in excess. The concentrated products are ultimately subjected to the treatment of polymerization described above.

The process according to our invention is preferably carried out in the following manner: The glycerides are first decomposed in the usual manner as by treating them with an alcali compound. The alcali salts of the fatty acids thus obtained are then treated with strong alcali, preferably a concentrated caustic soda lye. The product thus refined is now separated by means of sodium chloride. The product thus obtained is then heated in the presence of alcali in a closed vessel to a temperature between 200 and 215 degr. C. When the mass has reached a temperature of about 205 degr. C., the water in excess is driven off, until the soap contains at least 70 to 75 per cent fatty acids. It is not necessary to employ alcali in excess, free alcali being formed, while the water is being driven off, as substances which were bound to alcali, are carried away by the water while the alcali, which is thus set free, is left in the vessel.

The process described may be applied with advantage to the fatty by-products of the refining process, such products, commonly called soap-stock, being dark colored and containing alcali. On being subjected to the treatment described above they are converted into light-colored products having a pleasant odour.

The fact that the treatment in the closed vessel results in an increase of the refraction of light and of the density of the products obtained, whose iodine titer is considerably lowered, shows that polymerization has taken place.

The fatty acids obtained by the process described above are free of products of decomposition and of all pungent odour and are light-colored. The salts of the fatty acids may be converted into fatty acid or soap or may be utilized in any other suitable manner.

We claim:—

1. The process herein described which consists in purifying unsaturated fatty acids, converting the purified fatty acids into alkali salts, and heating said salts to a temperature of from about 200° to 215° C.

2. The herein described process, which consists in purifying and concentrating fatty acids from fish oil, oil waste and the like, converting the purified fatty acids into alkali salts, and heating said salts at a temperature of from about 200° to 215° C. until polymerization takes place.

3. The herein described process, which consists in converting glycerides of unsaturated fatty acids into alkali salts by treatment with alkali, treating the salts obtained with strong alkali, separating the product obtained from the liquor containing impurities, and treating the separated product with alkali at temperatures between about 200° and 215° C., until polymerization is obtained.

4. The herein described process, which consists in converting glycerides of unsaturated fatty acids into alkali salts by treatment of the glycerides with alkali, refining the salts obtained with strong alkali, separating the refined product from the liquor containing the impurities, and treating the refined product under pressure and at temperatures ranging from about 200° C. to about 215° C. with alkali until polymerization of the fatty acids is produced.

5. The herein described process which consists in decomposing fatty acids, glycerides of fish oils, oil waste and the like with alkali, refining the resulting reaction product by treating it with strong alkali, separating said refined reaction product from the liquor containing impurities, and then treating it under pressure and at temperatures ranging from about 200° to about 215° C. with strong alkali, until polymerization of the fatty acids is obtained.

6. The herein described process which consists in converting glycerides of unsaturated fatty acids into alkali salts of fatty acids by treatment with alkali, refining the salts obtained, and separating the refined product of salts from the liquor containing impurities, and treating the refined product with a polymerizing agent at temperatures ranging from about 200° to about 215° C.

7. The herein described process which consists in converting glycerides of unsaturated fatty acids into alkali salts of fatty acids by treatment with alkali, refining the salts obtained, and separating the refined product of salts from the liquor containing impurities, and then treating the refined product under pressure and at temperatures substantially ranging from about 200° to about 215° C. with a polymerizing agent.

8. The herein described process which consists in converting a non-saturated fatty acid free of glycerine into a soluble salt, heating the said salt under increased pressure and at a temperature of from about 180° to about 250° C., removing a part of the water, and continuing heating under pressure and at a temperature of from 180° to about 250° C.

9. The herein described process, which consists in converting a non-saturated fatty acid free of glycerine into a soluble salt, heating the said salt under increased pressure and at a temperature of from about 180° to about 215° C., removing a part of the water, and continuing heating under pressure and up to a temperature of about 215° C.

10. The herein described process which consists in decomposing a glyceride of a non-saturated fatty acid, separating the glycerine and converting the fatty acid into a soluble salt, heating the said salt under increased pressure and at a temperature of from about 180° to about 250° C., removing a part of the water, and continuing heating under pressure and at a temperature of from 180° to about 250° C.

11. The herein described process which consists in converting a non-saturated fatty acid free of glycerine into a soluble salt, refining the salt, heating the same under increased pressure and at a temperature of from about 180° to about 250° C., removing a part of the water, and continuing heating under pressure and at a temperature of from 180° to about 250° C.

12. The herein described process which consists in decomposing a glyceride of a non-saturated fatty acid, separating the glycerine and converting the fatty acid into a soluble salt, refining the salt, heating the same under increased pressure and at a temperature of from about 180° to about 250° C., removing a part of the water, and continuing heating under pressure and at a temperature of from 180° to about 250° C.

13. The herein described process which consists in decomposing a glyceride of a non-saturated fatty acid, converting the fatty acid into a soluble salt, heating the said salt under increased pressure and at a temperature of from about 180° to about 250° C., removing a part of the water, and continuing heating under pressure and at a temperature of from 180° to about 250° C.

14. The herein described process which consists in decomposing a glyceride of a non-saturated fatty acid, converting the fatty acid into a soluble salt, heating the said salt under increased pressure and at a temperature of from about 180° to about 250° C., removing so much water that the soap contains about 70 to 75 per cent fatty acid, and continuing heating under pressure and at a temperature of from 180° to about 250° C.

15. The herein described process which consists in decomposing a glyceride of a non-saturated fatty acid, converting the fatty acid into a soluble salt, heating the said salt under increased pressure and at a temperature of from about 180° to about 215° C., removing so much water that the soap contains about 70 to 75 per cent fatty acid, and continuing heating under pressure and up to a temperature of about 215° C.

JACOB LUND.
H. HAUSAMANN.